United States Patent
Grant

(10) Patent No.: US 7,261,323 B2
(45) Date of Patent: Aug. 28, 2007

(54) FUEL DAMPER

(75) Inventor: David Grant, Royal Oak, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 130 days.

(21) Appl. No.: 11/096,034

(22) Filed: Mar. 31, 2005

(65) Prior Publication Data

US 2006/0220370 A1 Oct. 5, 2006

(51) Int. Cl.
*B60P 3/22* (2006.01)

(52) U.S. Cl. .................. 280/834; 220/4.14; 137/574

(58) Field of Classification Search .............. 280/834; 220/4.14, 4.12, 563; 417/363, 357, 540; 137/574, 565.32
See application file for complete search history.

(56) References Cited

U.S. PATENT DOCUMENTS

| | | | | |
|---|---|---|---|---|
| 2,806,622 A | * | 9/1957 | Leirer | 220/4.14 |
| 4,789,170 A | * | 12/1988 | Reber | 280/838 |
| 5,482,444 A | * | 1/1996 | Coha et al. | 417/363 |
| 5,960,981 A | * | 10/1999 | Dodson et al. | 220/563 |
| 6,116,454 A | * | 9/2000 | Henderson et al. | 220/563 |
| 6,220,287 B1 | * | 4/2001 | Wolf | 137/574 |
| 6,276,201 B1 | | 8/2001 | Gette et al. | |
| 6,276,342 B1 | | 8/2001 | Sinz et al. | |
| 6,431,388 B1 | * | 8/2002 | Spickelmire et al. | 220/563 |
| 6,568,556 B1 | * | 5/2003 | Kahler et al. | 220/563 |
| 6,637,457 B2 | * | 10/2003 | Evanovich et al. | 137/574 |
| 7,025,574 B2 | * | 4/2006 | Cremer et al. | 417/363 |
| 2004/0173616 A1 | * | 9/2004 | Krogull | 220/563 |

FOREIGN PATENT DOCUMENTS

| | | |
|---|---|---|
| EP | 1169566 | 2/2002 |
| WO | WO01/57386 | 8/2001 |
| WO | WO03074863 | 9/2003 |

* cited by examiner

*Primary Examiner*—Tony Winner
(74) *Attorney, Agent, or Firm*—Rader, Fishman & Grauer, PLLC

(57) ABSTRACT

A device for dampening fuel movement in a tank having an aperture is provided. The device includes a fuel pump and a baffle connected to the pump so that the baffle is permitted to move from a retracted configuration to a deployed configuration. Further, when the device is in a retracted configuration, the device may be inserted into or passed through the aperture.

23 Claims, 4 Drawing Sheets

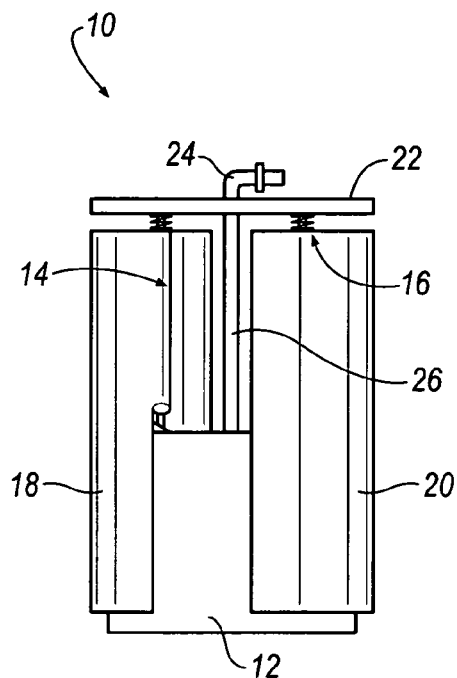
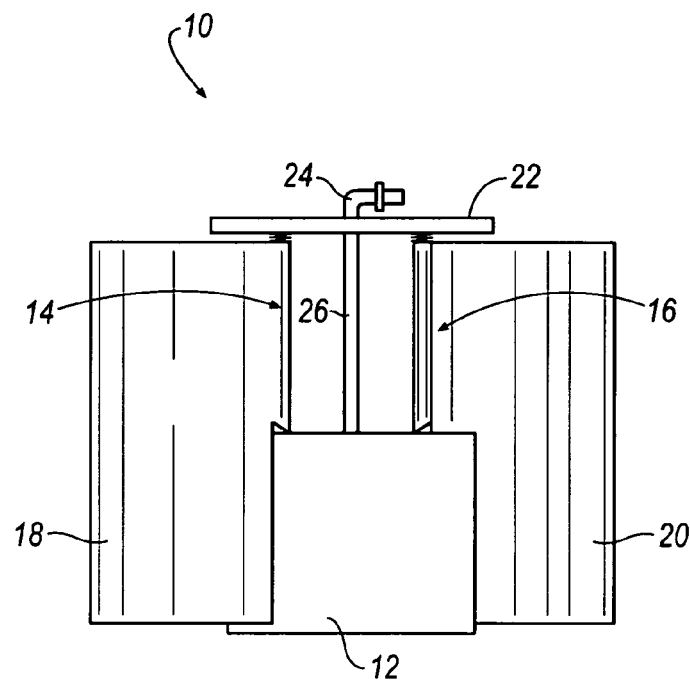
FIG. 2  FIG. 4
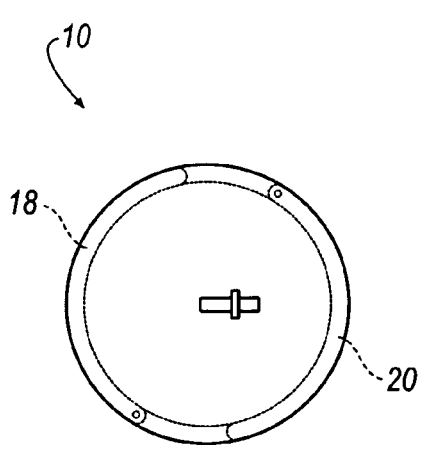
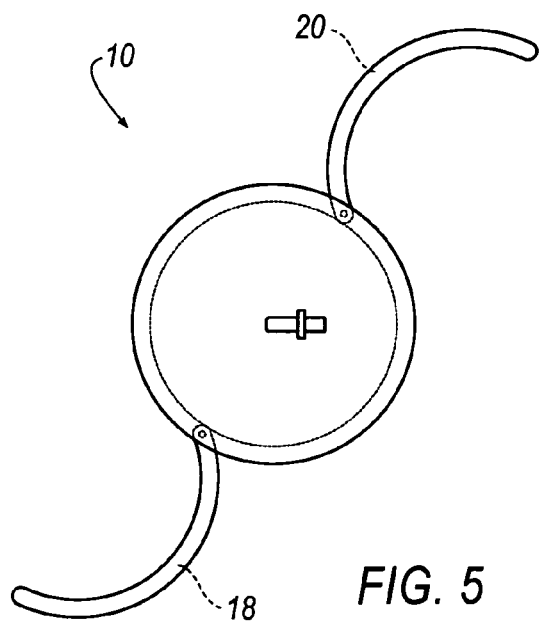
FIG. 3  FIG. 5

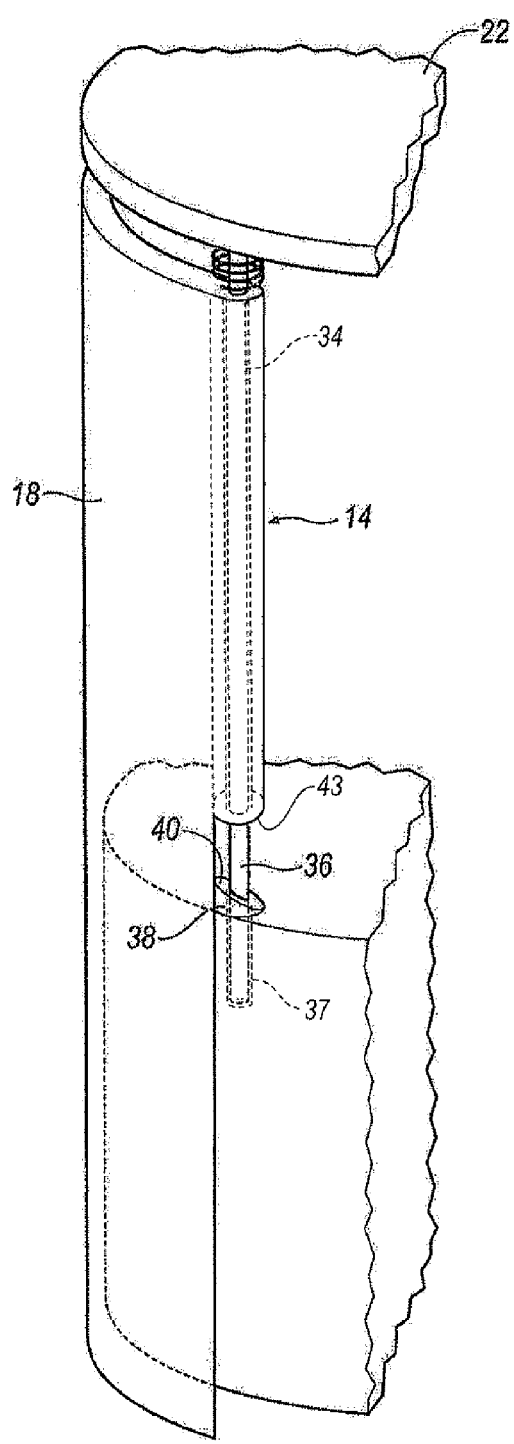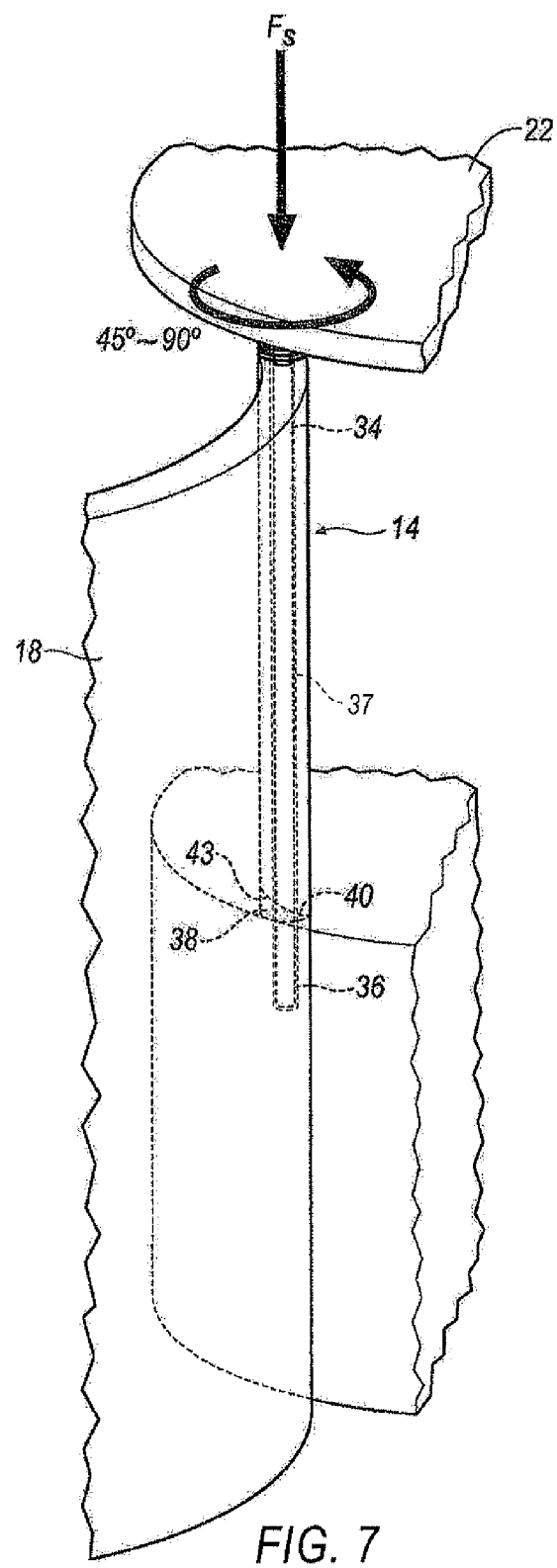
FIG. 6
FIG. 7

FUEL DAMPER

BACKGROUND

Baffles are commonly used in connection with fuel tanks to absorb or abate noise caused by the movement of fuel. Such baffles are typically positioned within the fuel tank and serve as a damper with respect to fuel moving within the tank.

BRIEF DESCRIPTION OF THE DRAWINGS

The present invention will now be described, by way of example, with reference to the accompanying drawings, in which:

FIG. 2 is a side view of a baffle and fuel pump according to an embodiment of the present invention;

FIG. 3 is a top view of a baffle and fuel pump according to an embodiment of the present invention;

FIG. 4 is a side view of a baffle and fuel pump according to an embodiment of the present invention;

FIG. 5 is a top view of a baffle and fuel pump according to an embodiment of the present invention;

FIG. 6 is a schematic view of a component for a baffle according to an embodiment of the present invention;

FIG. 7 is a schematic view of a component for a baffle according to an embodiment of the present invention;

DETAILED DESCRIPTION

Figure 1:
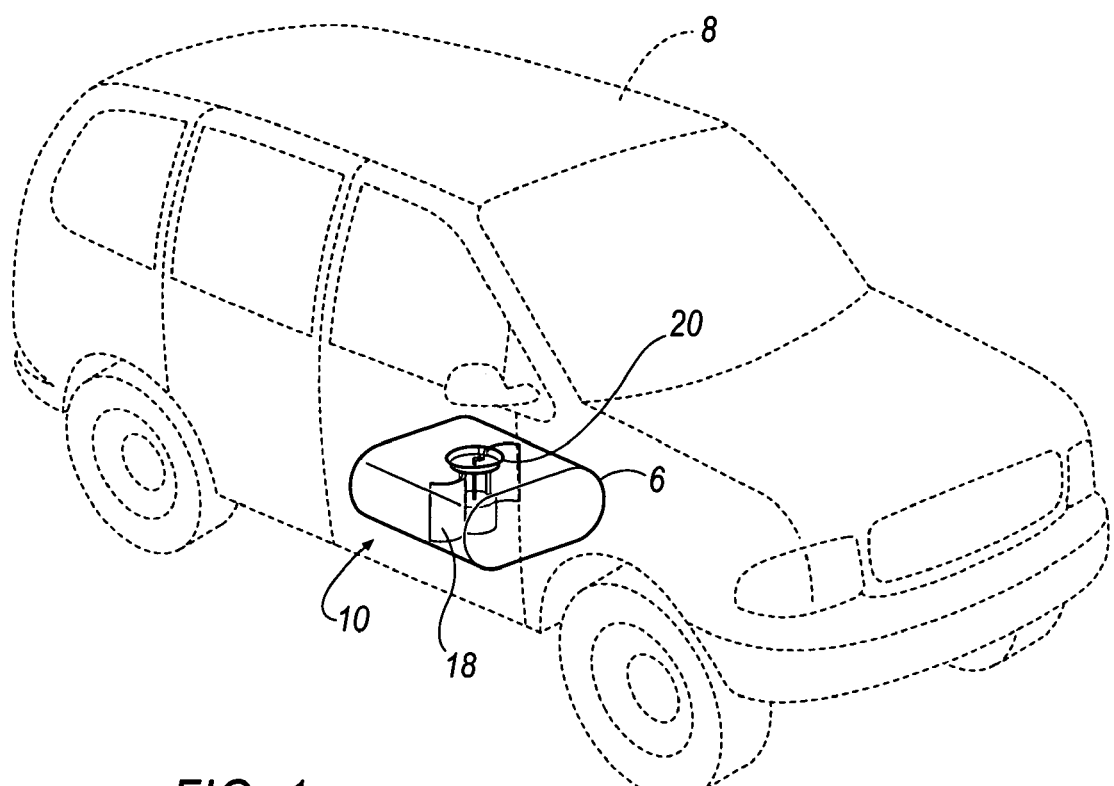
FIG. 1 is a schematic view of a baffle in a fuel tank according to an embodiment of the present invention.

Referring to FIGS. 1 through 5, an embodiment of a fuel pump and baffle assembly 10 is shown and described. In FIG. 1, an exemplary pump and baffle assembly 10 is shown in use in connection with a fuel tank 6 of a vehicle 8. FIGS. 2 and 3 illustrate an embodiment of an assembly 10 in a retracted position. FIGS. 4 and 5 illustrate an embodiment of an assembly 10, shown in an extended or deployed position. However, the invention is not limited to the illustrated embodiments, and other embodiments of an assembly with retracted and deployed positions are contemplated by and within the scope of the invention.

The illustrated fuel pump and baffle assembly 10 includes a fuel pump 12, baffles 18 and 20, rotating portions 14 and 16, surface 22, fuel port 24 and fuel line 26.

Fuel pump 12 may comprise any known fuel pump for drawing fuel from a tank (such as the generic tank generally represented in FIG. 1) and passing the fuel to other components of a system, for example, an internal combustion engine via a fuel line 26 and a fuel port 24. Rotating portions 14 and 16 may include, for example, rotatable portions generally supported by two surfaces, such as surface 22 and a portion of the fuel pump 12. If desired, all or portions of the baffle and the rotating portions may be comprised of plastic. However, other materials that sufficiently function in the intended environment may also be used. As will be described in greater detail, such rotating portions 14,16 may permit one or more baffles 18,20 to deploy from a retracted position (such as shown in FIGS. 2 and 3) to a deployed position (such as shown in FIGS. 4 and 5). Of course, one skilled in the art will readily recognize that, alternatively, one or three or more baffles may be employed in connection with the invention. Moreover, other means or variations for deployment of baffles, in addition to the rotational deployment illustrated, can be contemplated, and the present invention should not be construed as limited to the illustrated embodiments disclosed herein.

Baffles generally may be constructed of any suitable material for dampening the movement of fuel in a tank. As generally illustrated with respect to the embodiment shown in FIG. 1, baffles 18 and 20 provide a barrier that impedes or restricts the movement of fuel, for example, the movement of fuel from side to side in a fuel tank (e.g., "sloshing"). In embodiments of the invention the associated baffle or baffles may be generally curved and may include a surface that generally corresponds to or interconnects with a surface associated with the fuel pump 12 and/or surface 22. As will be described in greater detail with respect to the operation of an embodiment of the present invention, the size and shape of components of the assembly 10 and their respective surfaces can be configured to reduce or minimize the size of the fuel pump and baffle assembly 10 to facilitate insertion of all or a portion of the assembly into a portion of a tank. More specifically, in a retracted position, such as generally illustrated in FIG. 3, assembly 10 has a reduced effective diameter or cross-sectional configuration to permit the assembly 10 to be more easily inserted or positioned through a relatively smaller aperture when compared with an effective diameter or cross-sectional configuration in an extended or deployed configuration, for example as shown in FIG. 5. Again, the invention is not limited to the illustrated embodiments, and one skilled in the art will readily recognize that many other configurations for the baffles and their deployment may instead be used in connection with embodiments of the invention.

Referring now to FIGS. 6 and 7, an embodiment of an assembly 10 with a rotating portion (such as 14) is further described. For some embodiments, all of the baffles and the associated rotating portions may be identical in construction. In other embodiments, the construction of one or more baffles and/or associated rotating portions may differ. For ease of description, FIGS. 6 and 7, merely depict a single exemplary baffle 18. However, as previously noted, the invention is not limited to the illustrated embodiments and one skilled in the art will recognize that many different baffle constructions and numbers of baffles may be used in connection with a given assembly.

In the exemplary embodiment shown in FIG. 6, the associated rotating portion (generally designated as element 14) is shown in connection with a corresponding baffle 18 in a substantially retracted position. In one embodiment, the rotating portion 14 is supported within the assembly, for example, by an upper shaft portion 34 and a lower shaft portion 36, which may comprise separate segments or portions (e.g., as generally illustrated in FIGS. 6 and 7 in solid line format) or, may alternatively, when the rotating portions include an extended aperture (designated in phantom as element 37), comprise a continuous rod or shaft (a "rod," is generally illustrated in the figures in broken line format) that may extend through such an extended aperture and beyond the associated rotating portion 14. If a continuous rod or shaft is employed, the rod or shaft may be comprised of metal to, among other things, provide added structural integrity to the assembly. Further, if desired, such a continuous rod or shaft may be rigidly mounted to an upper surface or plate and may be left to freely slide though a lower portion of the assembly (for example, as generally shown in the broken line embodiments illustrated).

As generally depicted (in the solid line format) in the illustrated embodiment, the upper shaft portion 34 and lower shaft portion 36 may be connected to, or inserted within, formations (such as apertures) associated with the associated rotating portion 14 to permit the rotating portion 14 to move or rotate about the upper shaft portion 34 and lower shaft portion 36. Additionally, if apertures are provided in rotating portion 14, they may be made sufficiently deep to permit the associated rotating portion 14 to move up and down in a sliding (i.e., sliding or telescoping) manner with respect to the upper shaft portion 34 and lower shaft portion 36. In other embodiments, not illustrated, the "pin-hole" relationship between the rotating portion 14 and the upper and lower shaft portions 34,36 may be reversed.

A baffle guide (for example, as illustrated as element 38) may be disposed on an upper surface of the fuel pump. If desired, the baffle guide 38 may include a curved or circular portion and may include a shaped (e.g., ramped) portion 40. For some embodiments of the assembly, shaped portion 40 may be angled with respect to the normal orientation of the rotating portions 14. In the depicted embodiment, lower shaft portion 36 is shown as extending upwardly from the baffle guide 38 to at least partially direct the movement of rotating portion 14 in a downward direction toward shaped portion 40. Rotating portion 14 may include a lower face 43 that also may be angled with respect to the normal orientation of rotating portion 14. As may be seen, in FIG. 6. the lower face 43 will be angled with respect to the shaped portion 40 when the rotating portion 14 is in the retracted position.

In the embodiment shown in FIG. 7, rotating portion 14 is shown when a baffle 18 is in a deployed or extended position. In such a configuration, surface 22 may be compressed against rotating portion 14. Lower face 43 will rotate with the rotating portion 14 such that lower face 43 may be positioned against (e.g., substantially flush against) shaped portion 40.

Figure 8:
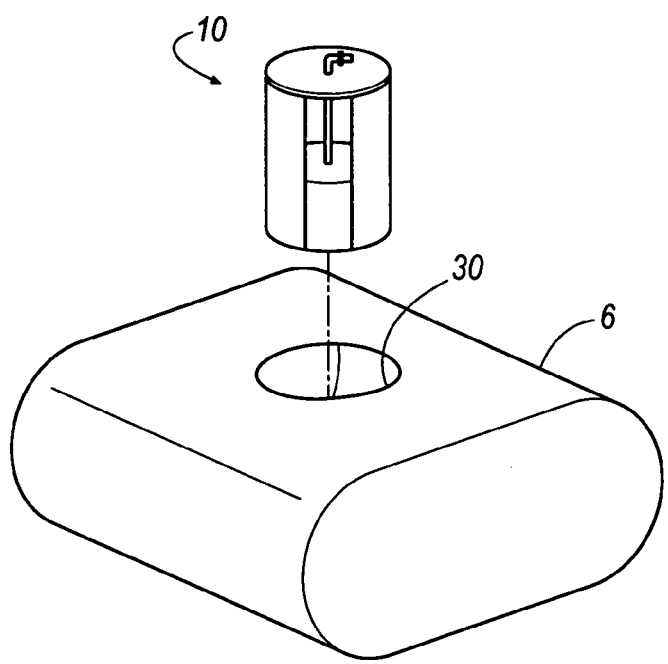
FIG. 8 is a perspective view of a fuel tank and baffle according to an embodiment of the present invention.
Figure 9:
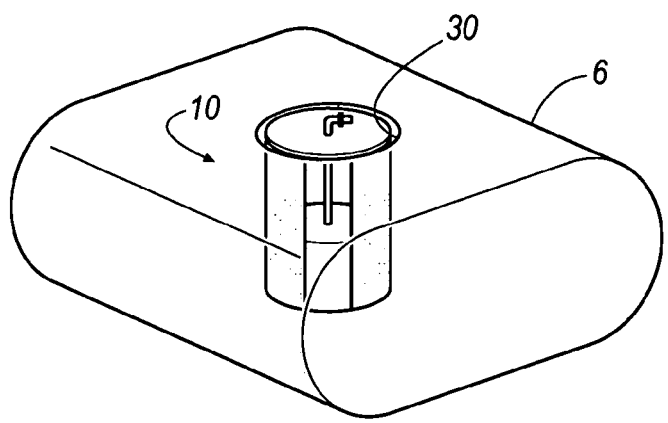
FIG. 9 is a perspective view of a fuel tank and baffle according to an embodiment of the present invention.
Figure 10:
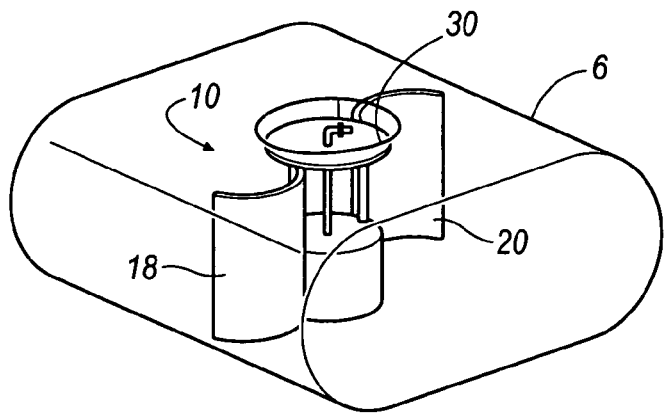
FIG. 10 is a perspective view of a fuel tank and baffle according to an embodiment of the present invention.

With reference now to FIGS. 8-10, the operation of an embodiment of the invention is shown and described. If desired, the fuel pump and baffle assembly 10 may be inserted or positioned into or through an aperture 30 in a substantially retracted configuration (such as generally illustrated in FIGS. 8 and 9). Once inserted into the tank 6 or positioned to a sufficient extent with respect to the walls of the aperture 30, one or more baffles (e.g., 18 and 20) may be deployed into an extended arrangement (for example, as shown in FIG. 10).

As shown in FIG. 8, fuel pump and baffle assembly 10 may be inserted or placed into or through aperture 30. Turning next to FIG. 9, the pump and baffle assembly 10 may be pressed against the bottom of tank 6 or another surface thereof. As previously illustrated in FIG. 6, surface 22 of the assembly 10 may be pressed downward toward the rotating portions 14,16. For some embodiments, a force (such as Fs shown in FIG. 7) can be applied to generally collapse (for e.g., in a sliding or telescoping manner) or reduce the longitudinal extent of the upper shaft portion 34 against a resistance (such as provided by a biasing device, e.g., spring 44), the associated rotating portion 14, and lower shaft portion 36. In response to such a movement or collapse, lower face 43 may then interface with or interfere with shaped portion 40. The different angular orientations associated with shaped portion 40 and lower face 43 may cause rotating the associated rotating portion 14 to rotate until shaped portion 40 is substantially flush against or otherwise impeded by lower face 43. This rotation, in turn, may force an associated baffle 18 to move from the position generally shown in FIGS. 2 and 3 to a position such as generally illustrated in FIGS. 4 and 5.

As shown in the embodiment of FIG. 10, baffles 18 and 20 are positioned in an expanded or deployed configuration, which can, among other things, reduce or abate fuel movement within an associated tank 6. Once the assembly 10 is in a desired position, aperture 30 can be sealed, as desired, and pressure may be maintained with respect to the assembly 10 by sealing the aperture 30 such that, if desired, the shaped portion 40 may be pressed or held against lower face 43 following deployment to generally maintain the baffles 18 and 20 in a deployed position. FIG. 1 shows an assembly 10 positioned within a fuel tank 6 that is supported by and/or connected to a portion of a vehicle 8.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A device for dampening fuel movement in a tank having an aperture, comprising: a fuel pump; and a baffle connected to the pump such that the baffle is adapted to move from a retracted configuration to a deployed configuration, wherein the baffle is adapted to dampen the movement of fuel when the baffle is in the deployed configuration, and further wherein, when in the retracted configuration, the device may be inserted into or passed through said aperture.

2. The device according to claim 1, wherein the device includes two baffles and each of the baffles are connected to opposite sides of the fuel pump.

3. The device according to claim 1, wherein the device includes a plurality of baffles.

4. The device according to claim 3, wherein the baffles are shaped to conform to an outer portion of the fuel pump when the baffles are in the retracted configuration.

5. The device according to claim 3, further comprising: means for positioning the baffle in the deployed configuration when a portion of the baffle engages the baffle guide.

6. The device according to claim 1, further comprising: a rotating portion associated with the baffle; and a rod.

7. The device according to claim 6, wherein the rotating portion includes an extended aperture and the rod extends through the extended aperture.

8. The device according to claim 7, wherein the rod is rigidly secured at least one end.

9. The device according to claim 1, further comprising a baffle guide.

10. The device according to claim 9, wherein the baffle guide has a shaped portion adapted to move the baffle from the retracted configuration to the deployed configuration.

11. The device according to claim 10, further comprising: a rotating portion associated with the baffle, wherein the shaped portion is adapted to position the baffle in the deployed configuration when the rotating portion engages the shaped portion of the baffle guide.

12. The device according to claim 11, further comprising: an upper shaft portion extending in a downward direction from a surface; and a lower shaft portion extending in an upward direction from the shaped portion of the baffle guide.

13. The device according to claim 12, wherein the upper shaft portion and lower shaft portion are in a sliding arrangement with the rotating portion.

14. The device according to claim 13, wherein the shaped portion is adapted to position the baffle in the deployed configuration when the sliding arrangement is moved to the retracted configuration.

15. The device according to claim 14, further comprising: a biasing device positioned between the surface and the rotating portion, wherein the biasing device is adapted to compress as the baffle is moved from the retracted configuration to the deployed configuration.

16. The device according to claim 15, wherein: the shaped portion of the baffle guide includes an angled surface; a mating surface of the rotating portion includes an angled surface; and the angled surface of the mating surface and the angled surface of the shaped portion are adapted to be in a contacting relationship when the baffle is in the deployed configuration and in a non-contacting relationship when the baffle is in the retracted configuration.

17. An assembly, comprising: a fuel tank having an aperture; a fuel pump; and a baffle connected to the pump such that the baffle is adapted to move from a retracted configuration to a deployed configuration, wherein the baffle is adapted to dampen the movement of fuel when the baffle is in the deployed configuration, and further wherein, when in the retracted configuration, the device may be inserted into or passed through the aperture in the fuel tank.

18. The assembly according to claim 17, comprising a plurality of baffles.

19. The assembly according to claim 18, wherein the baffles form an outer surface of the fuel pump when the baffles are in the retracted configuration.

20. The assembly according to claim 17, further comprising a baffle guide.

21. The assembly according to claim 20, wherein the baffle guide has a shaped portion adapted to move the baffle from the retracted configuration to the deployed configuration when the baffle engages the shaped portion.

22. The assembly according to claim 21 further comprising: a rotating portion associated with the baffle; an upper shaft portion extending in a downward direction with respect to a surface; and a lower shaft portion extending in an upward direction from the shaped portion of the baffle guide, wherein the upper shaft portion and lower shaft portion are adapted to be in a sliding arrangement with the rotating portion, and further wherein the shaped portion is adapted to position the baffle in the deployed configuration when the sliding arrangement is moved to a retracted configuration.

23. A vehicle, comprising: a vehicle portion; a fuel tank having an aperture, the fuel tank supported by or connected to the vehicle portion; a fuel pump; and a baffle connected to the pump such that the baffle adapted to move from a retracted configuration to a deployed configuration; wherein the baffle is adapted to dampen the movement of fuel when the baffle is in the deployed configuration; and further wherein, when in the retracted configuration, the device may be inserted into or passed through the aperture in the fuel tank.

* * * * *